United States Patent
Cho et al.

(10) Patent No.: US 9,098,735 B2
(45) Date of Patent: Aug. 4, 2015

(54) PORTABLE DEVICE INCLUDING A FINGERPRINT SCANNER AND METHOD OF CONTROLLING THEREFOR

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/909,803

(22) Filed: Jun. 4, 2013

(65) Prior Publication Data

US 2014/0341447 A1    Nov. 20, 2014

(30) Foreign Application Priority Data

May 14, 2013    (KR) .................. 10-2013-0054369

(51) Int. Cl.
    *G06K 9/00*        (2006.01)

(52) U.S. Cl.
    CPC .................................. *G06K 9/00087* (2013.01)

(58) Field of Classification Search
    None
    See application file for complete search history.

(56) References Cited

U.S. PATENT DOCUMENTS

| | | | |
|---|---|---|---|
| 6,337,919 B1 * | 1/2002 | Dunton | 382/124 |
| 6,628,757 B1 | 9/2003 | Cannon et al. | |
| 6,850,632 B1 * | 2/2005 | Boyd et al. | 382/124 |
| 6,912,299 B1 | 6/2005 | Hoshino | |
| 7,681,194 B2 * | 3/2010 | Van Ee et al. | 718/100 |
| 8,566,045 B2 * | 10/2013 | Shaffer et al. | 702/57 |
| 2004/0208348 A1 * | 10/2004 | Baharav et al. | 382/124 |
| 2005/0085217 A1 * | 4/2005 | Lim | 455/410 |
| 2007/0014442 A1 * | 1/2007 | Yu | 382/124 |
| 2008/0022364 A1 * | 1/2008 | Oikawa et al. | 726/2 |
| 2008/0049980 A1 * | 2/2008 | Castaneda et al. | 382/115 |
| 2008/0122796 A1 * | 5/2008 | Jobs et al. | 345/173 |
| 2009/0037743 A1 * | 2/2009 | Narayanaswami | 713/186 |
| 2009/0146779 A1 * | 6/2009 | Kumar et al. | 340/5.31 |
| 2009/0306980 A1 * | 12/2009 | Shin | 704/235 |
| 2010/0265179 A1 * | 10/2010 | Ram | 345/163 |
| 2010/0321152 A1 * | 12/2010 | Argudyaev et al. | 340/5.53 |
| 2011/0080260 A1 | 4/2011 | Wang et al. | |
| 2011/0298711 A1 * | 12/2011 | Dean et al. | 345/161 |
| 2011/0310537 A1 * | 12/2011 | Imamura et al. | 361/679.01 |
| 2012/0026117 A1 * | 2/2012 | Schneider et al. | 345/173 |
| 2012/0050769 A1 * | 3/2012 | Houjou et al. | 358/1.9 |
| 2012/0071149 A1 * | 3/2012 | Bandyopadhyay et al. | 455/418 |

(Continued)

FOREIGN PATENT DOCUMENTS

| | | |
|---|---|---|
| KR | 10-2005-0024810 A | 3/2005 |
| KR | 10-2006-0076641 A | 7/2006 |
| WO | WO 2012/054357 A1 | 4/2012 |

*Primary Examiner* — Stephen R Koziol
*Assistant Examiner* — Sean Conner
(74) *Attorney, Agent, or Firm* — Birch, Stewart, Kolasch & Birch, LLP

(57) ABSTRACT

A method of controlling a portable device according to one embodiment of the present specification may be able to selectively activate the functions of a multifunctional control button. The method of controlling the portable device may include the steps of sensing a first control input for a control button configured to perform a fingerprint recognition function and a control input detection function, recognizing a fingerprint of the first control input by activating the fingerprint recognition function, if the fingerprint recognition function is activated, deactivating the control input detection function, and if the activated fingerprint recognition function is terminated, activating the control input detection function.

20 Claims, 7 Drawing Sheets

(56) References Cited

U.S. PATENT DOCUMENTS

| | | |
|---|---|---|
| 2012/0092127 A1* | 4/2012 | Ganapathi et al. ............ 340/5.53 |
| 2012/0092293 A1* | 4/2012 | Ganapathi et al. ............. 345/174 |
| 2012/0127179 A1* | 5/2012 | Aspelin ......................... 345/441 |
| 2012/0299814 A1* | 11/2012 | Kwon et al. ................... 345/156 |
| 2013/0102273 A1 | 4/2013 | Jung et al. |
| 2013/0129162 A1* | 5/2013 | Cheng et al. .................. 382/124 |
| 2013/0162534 A1* | 6/2013 | Chen et al. .................... 345/158 |
| 2013/0169577 A1* | 7/2013 | Rofougaran ................... 345/173 |
| 2013/0263252 A1* | 10/2013 | Lien et al. ........................ 726/19 |
| 2013/0298224 A1* | 11/2013 | Heilpern ......................... 726/19 |
| 2014/0003678 A1* | 1/2014 | Vieta et al. .................... 382/124 |
| 2014/0007223 A1* | 1/2014 | Han et al. ........................ 726/16 |
| 2014/0056493 A1* | 2/2014 | Gozzini ......................... 382/124 |
| 2014/0337791 A1* | 11/2014 | Agnetta et al. ................ 715/784 |

* cited by examiner

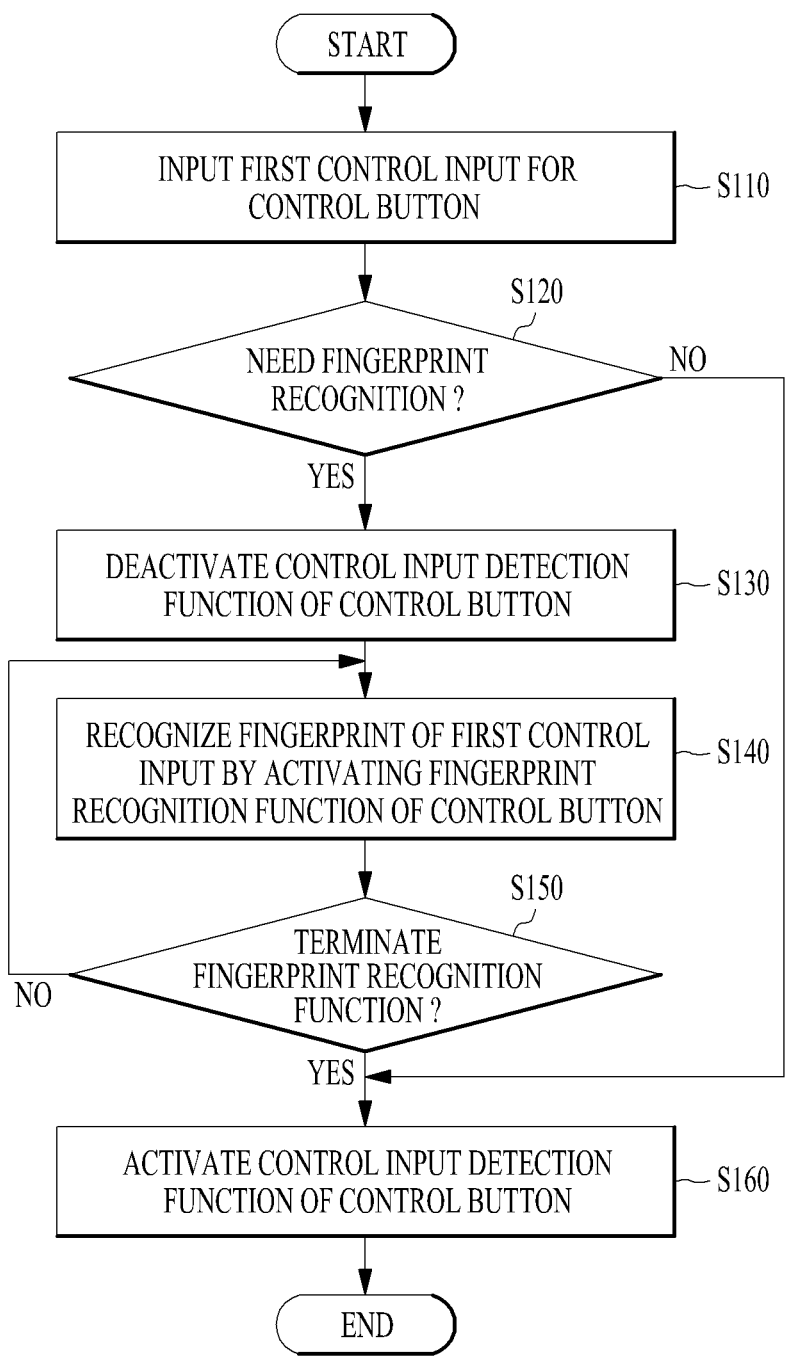

PORTABLE DEVICE INCLUDING A FINGERPRINT SCANNER AND METHOD OF CONTROLLING THEREFOR

Pursuant to 35 U.S.C. §119(a), This application claims the benefit of the Korean Patent Application No. 10-2013-0054369, filed on May 14, 2013, which is hereby incorporated by reference as if fully set forth herein.

BACKGROUND OF THE INVENTION

1. Field of the Invention

The present specification relates to a portable device, and more particularly, to a portable device with a button providing fingerprint recognition function.

2. Discussion of the Related Art

As various portable devices are disseminated, shopping and financial transactions using a portable device are enabled. The portable device may access a security system using a password and a certificate. In particular, the portable device providing a function of recognizing a fingerprint may be able to increase a security level by recognizing a fingerprint of a user.

The portable device may be able to use an external fingerprint recognition device. Yet, in order to increase portability, the portable device may be able to include an inner embedded fingerprint recognition device. A separate button can be installed in the portable device for the inner embedded fingerprint recognition device. And, the portable device can be equipped with a multi-function control button to which a fingerprint recognition function is additionally added to a control button performing a control input detection function.

Yet, in case of the multi-function control button including the fingerprint recognition function and the control input detection function in the control button, if a control input of a user is inputted, the portable device should determine whether a control input detection function of the control button is activated or the fingerprint recognition function is activated. In case that the user touches the control button to use the fingerprint recognition function, if the control input detection function is activated and then the execution function of the control button is executed, unintended error may occur.

SUMMARY OF THE INVENTION

Accordingly, the present specification is directed to an apparatus and method thereof that substantially obviate one or more problems due to limitations and disadvantages of the related art.

An object of the present specification is to provide a portable device including a control button providing a fingerprint recognition function and a method of controlling the portable device. In particular, according to the present specification, it is necessary for the portable device to provide a method of selectively activating a fingerprint recognition function and a control input detection function of the control button.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable device according to one embodiment of the present specification includes a display configured to display an execution screen of an application, a control button configured to perform a fingerprint recognition function and a control input detection function, and a controller configured to control the display and the control button and configured to execute an execution function according to a detected control input, wherein if a first control input is inputted, the controller is configured to recognize a fingerprint of the first control input by activating the fingerprint recognition function, wherein if the fingerprint recognition function is activated, the controller is configured to deactivate the control input detection function, and wherein if the activated fingerprint recognition function is terminated, the controller is configured to activate the deactivated control input detection function.

A method of controlling a portable device according to one embodiment of the present specification includes the steps of sensing a first control input for a control button configured to perform a fingerprint recognition function and a control input detection function, recognizing a fingerprint of the first control input by activating the fingerprint recognition function, recognizing a fingerprint of the first control input by activating the fingerprint recognition function, and if the activated fingerprint recognition function is terminated, activating the control input detection function.

It is to be understood that both the foregoing general description and the following detailed description of the present specification are exemplary and explanatory and are intended to provide further explanation of the invention as claimed.

Advantageous Effects

According to the present specification, a portable device is able to provide a fingerprint recognition function and a control input detection function using one control button.

According to the present specification, a portable device is able to temporarily deactivate a control input detection function in case that a fingerprint recognition function of a control button is activated.

According to the present specification, a portable device is able to selectively activate functions of a multi-function control button.

According to the present specification, a portable device is able to execute a control input detection function after completing a fingerprint recognition function of a control button.

According to the present specification, a portable device is able to prevent an error of a multi-function control button.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a flowchart for a method of controlling a portable device according to a different embodiment of the present specification.

DETAILED DESCRIPTION OF THE INVENTION

In the following description, embodiments are explained in detail with reference to the attached drawings and the contents written on them. A scope intended to claim may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device may include at least one selected from the group consisting of a smartphone, a smart pad, a music player, a tablet computer, and a note book. In the present specification, the portable device may be able to include a control button. The control button may correspond to a push button, touch button, or a displayed button.

Figure 1:
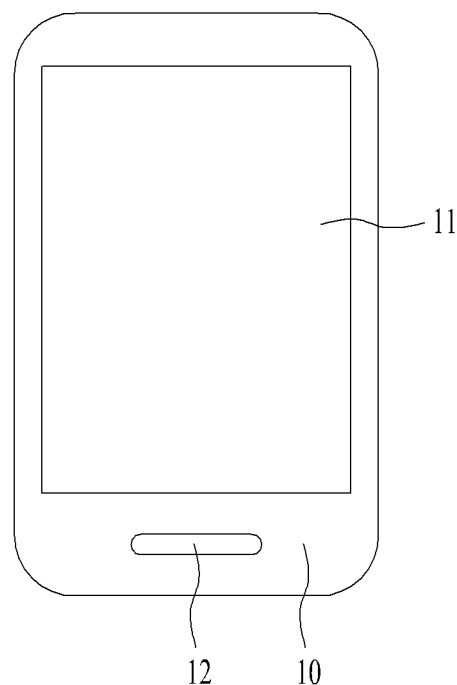
FIG. 1 is a diagram of a portable device according to one embodiment of the present specification.
Figure 1:
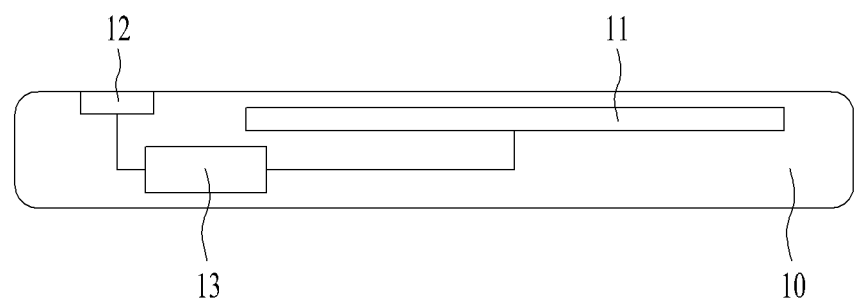

FIG. 1 is a diagram of a portable device according to one embodiment of the present specification. As shown in the top of FIG. 1, the portable device 10 may include a display unit 11 and a control button 12. As shown in the bottom of FIG. 1, the portable device 10 may further include a controller 13 controlling the display unit 11 and the control button 12 as well.

The display unit 11 may be able to display a user interface. The display unit 11 may be able to display an execution screen of an application or a home screen of the user interface. The display unit 11 may be able to display the user interface controlled in response to a control input inputted in the control button 12.

The control button 12 may be able to perform a plurality of functions. For instance, the control button may be able to perform a control input detection function and a fingerprint recognition function. The control button 12 detects a control input or recognizes a fingerprint and may be then able to deliver the information on the control input or the fingerprint to the controller.

The control input detection function corresponds to a function of detecting a press or a touch for the control button 12 of a user. The control button 12 detects the control input and may be then able to deliver the detected control input to the controller 13. The control button 12 may be able to detect the control input using at least one selected from the group consisting of a detection switch, a resistive touch screen, and a capacitive touch screen.

The fingerprint recognition function corresponds to a function of recognizing a fingerprint of a user. In case that the control input is inputted by a finger of the user, the control button 12 may be able to recognize the fingerprint of the finger. The control button may be able to include a fingerprint recognition sensor. For instance, the control button 12 may be able to include at least one selected from the group consisting of an ultrasonic sensor, a capacitance sensor, and an image sensor as the fingerprint recognition sensor.

The controller 13 is configured to control the display unit and the control button 12. The controller 13 receives information on the control input detected by the control button 12 or the recognized fingerprint, executes a control command in response to the information, or may be able to execute a security authentication using the recognized fingerprint. The controller 13 may be able to measure the time of which the control input is detected. The controller 13 may be able to measure a control input time, which corresponds to the time from which the control input for the control button is inputted to the end of the control input.

Figure 2:
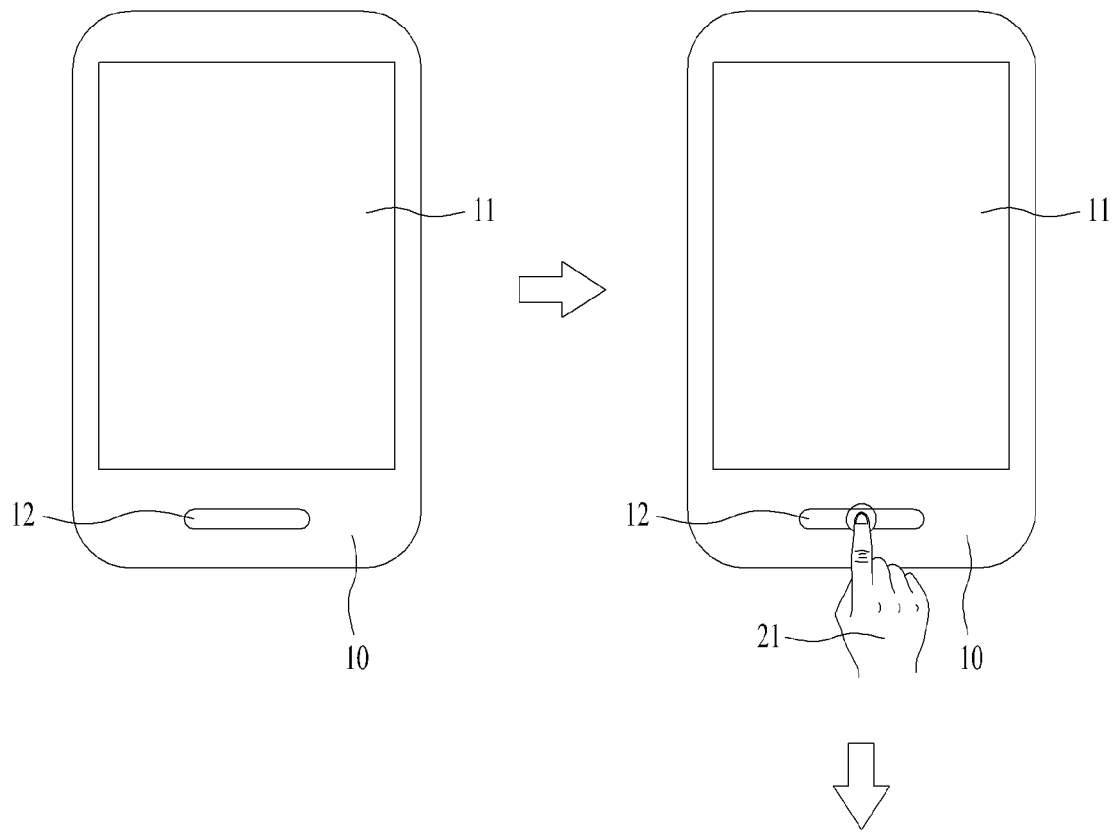
FIG. 2 is a diagram of a method of executing a first execution function of a portable device according to one embodiment of the present specification.
Figure 2:
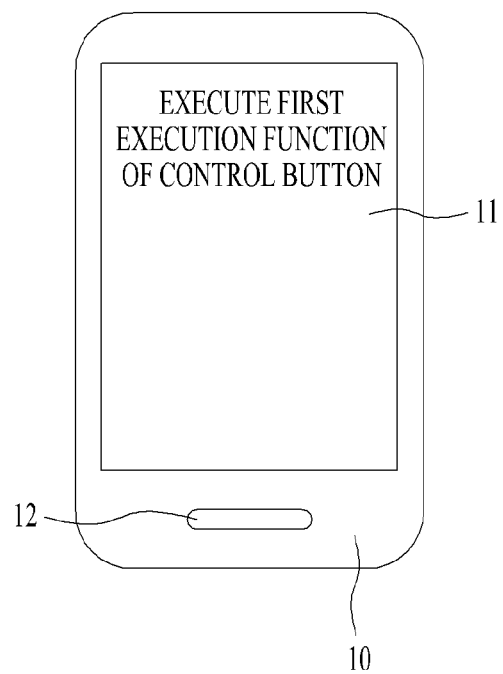

FIG. 2 is a diagram of a method of executing a first execution function of a portable device according to one embodiment of the present specification. As shown in the top left of FIG. 2, the portable device 10 may be able to display a user interface in the display unit 11. In case that an application is currently executing, the portable device 10 may be able to display an execution screen of the application in the display unit 11. And, the portable device 10 may be able to display a home screen or a lock screen in the display unit 11.

As shown in the top right of FIG. 2, in case that a control input 21 is inputted in the control button 12, the portable device may be able to detect the control input 21 using the control input detection function. The portable device 10 may be able to execute an execution function assigned to the control button according to the detected control input 21. In case that a control input time, which corresponds to the time of inputting the control input 21, is less than a first threshold time, the portable device may be able to execute a first execution function.

As shown in the bottom right of FIG. 2, the portable device executes the first execution function of the control button and may be then able to apply it in the display unit. For instance, the portable device may be able to move from the execution screen of the application to the home screen in a manner of executing the first execution function.

Figure 3:
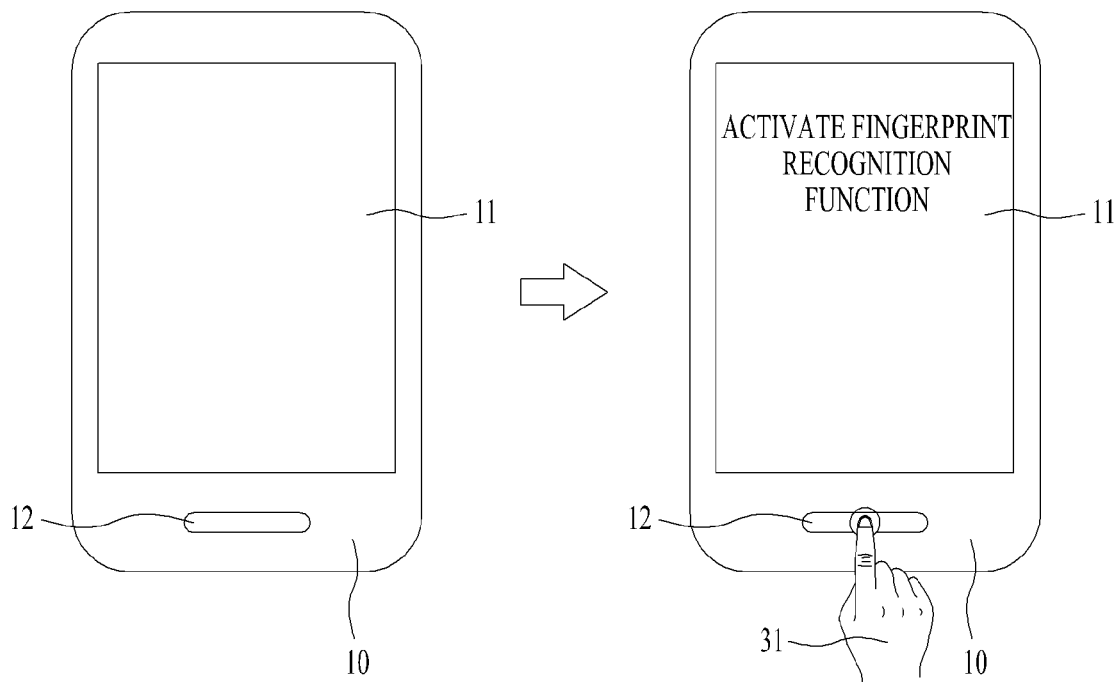
FIG. 3 is a diagram of a method of executing a first execution function of a control button according to a different embodiment of the present specification.
Figure 3:
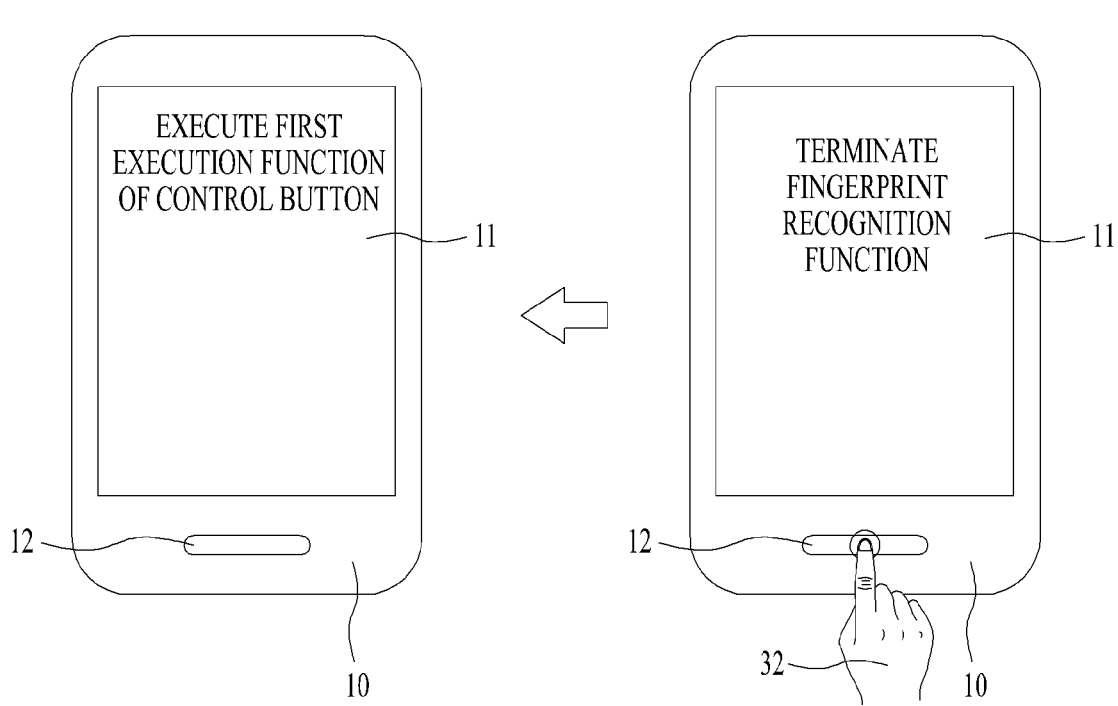

FIG. 3 is a diagram of a method of executing a first execution function of a control button according to a different embodiment of the present specification. As shown in the top left of FIG. 3, the portable device 10 may be able to display a user interface in the display unit 11. In case that an application is currently executing, the portable device 10 may be able to display an execution screen of the application in the display unit 11. And, the portable device 10 may be able to display a home screen or a lock screen in the display unit 11.

As shown in the top right of FIG. 3, in case that a control input 31 is inputted in the control button 12, the portable device may be able to execute a fingerprint recognition function. The portable device may be able to recognize a fingerprint of a user using a fingerprint recognition sensor included in the control button 12. The portable device may be able to deactivate the control input detection function while the fingerprint recognition function is executed. Although the control button is pressed or touched by the control input 31, the portable device 10 does not detect it as the control input and may be able to ignore or bypass the control input. In particular, the portable device may be able to avoid the execution of other operations, which are resulted from detecting the control input, except the fingerprint recognition while the fingerprint recognition function is executed. For instance, although the user presses or touches the control button to use the fingerprint recognition function in a manner of putting a finger on the control button 12, the portable device may be able to perform the fingerprint recognition function only. In other words, the portable device may not perform the execution function of the control button 12, which is corresponding to a press or a touch for the control button, although the control button of the portable device is pressed or touched.

In case that the fingerprint recognition function is activated and the control input detection function is deactivated, the portable device may be able to display a soft button corresponding to the control button 12 in the display unit 11. In particular, the portable device may be able to display the soft button capable of performing the deactivated control input detection function of the control button instead. While using the fingerprint recognition function, a user may be able to execute an execution function of the control button in a manner of touching or pressing the displayed soft button. For instance, in case that the execution function of the control button corresponds to a cancel function, the portable device displays the soft button executing the cancel function in the display unit. If the user touches the soft button, the fingerprint recognition function, which is currently executed, can be terminated or cancelled. As a different example, in case that the execution function of the control button corresponds to an function of displaying a home screen, the portable device displays a soft button capable of executing a home screen display function in the display unit and may be able to display the home screen if the user touches the soft button.

As shown in the bottom right of FIG. 3, if the fingerprint recognition function is terminated, the portable device may be able to activate the control input detection function. The portable device may be able to detect a control input 32 using the activated control input detection function. In this case, the control input 32 may be identical to the control input 31 inputted for the fingerprint recognition. Or, it may correspond to a new control input 32 inputted after the control input 31 for the fingerprint recognition is terminated according to an embodiment. The portable device may be able to execute an execution function assigned to the control button according to the detected control input 32. In case that a control input time, which corresponds to the time of inputting the control input 32, is less than a first threshold time, the portable device may be able to execute a first execution function.

As shown in the bottom left of FIG. 3, the portable device executes the first execution function of the control button and may be then able to apply it in the display unit. For instance, the portable device may be able to move from the execution screen of the application to the home screen in a manner of executing the first execution function.

Figure 4:
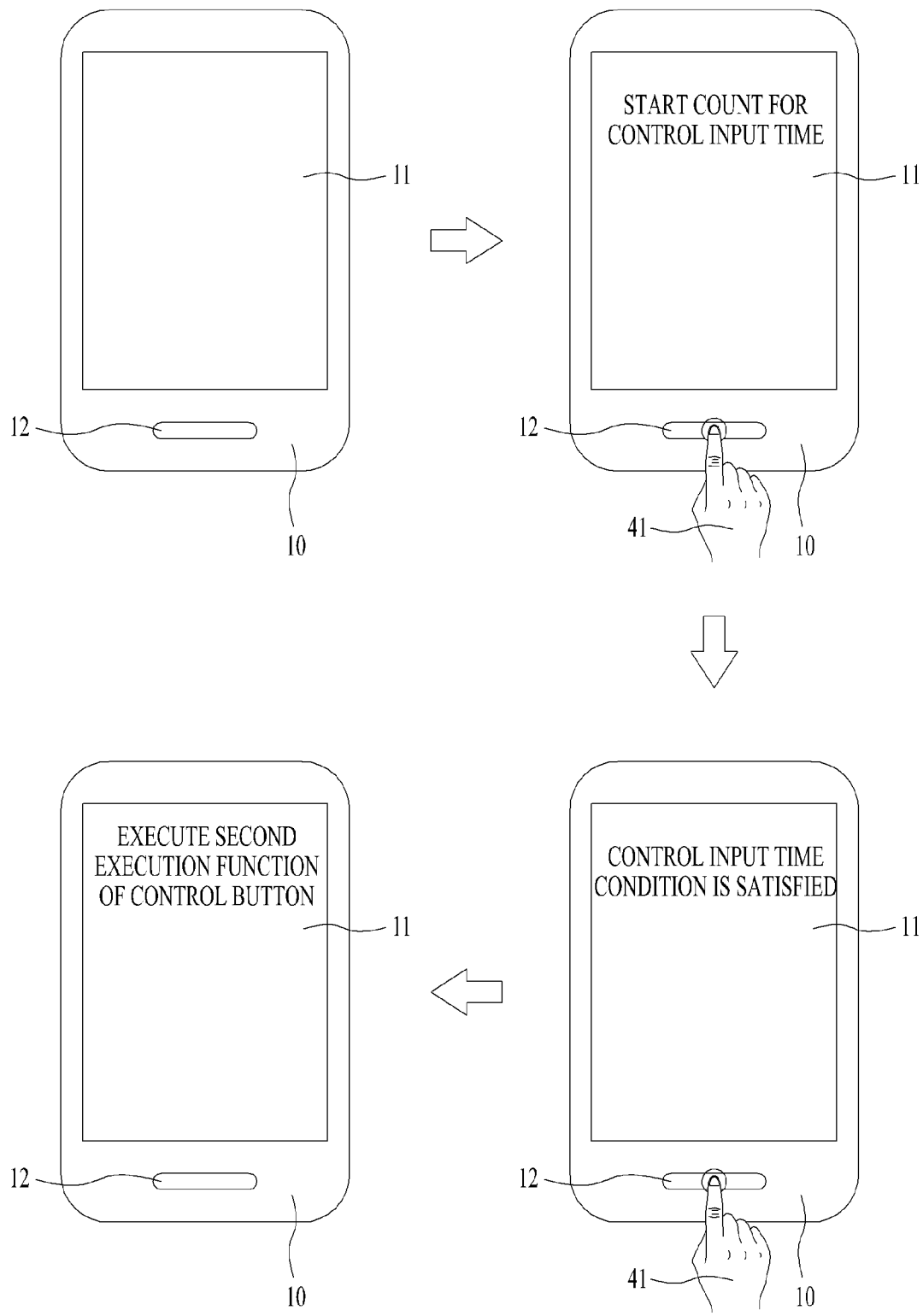
FIG. 4 is a diagram of a method of executing a second execution function of a portable device according to one embodiment of the present specification.

FIG. 4 is a diagram of a method of executing a second execution function of a portable device according to one embodiment of the present specification. As shown in the top left of FIG. 4, the portable device 10 may be able to display a user interface in the display unit 11. In case that an application is currently executing, the portable device 10 may be able to display an execution screen of the application in the display unit 11. And, the portable device 10 may be able to display a home screen or a lock screen in the display unit 11.

As shown in the top right of FIG. 4, in case that a control input 41 is inputted in the control button 12, the portable device may be able to detect the control input using a control input detection function. If the control input 41 is detected, the portable device 10 may be able to measure a control input time corresponding to the time of which the control input is detected. The portable device 10 may be able to start a count for the control input time from the time of which the control input 41 is detected.

As shown in the bottom right of FIG. 4, if a control input time condition is satisfied in a manner of maintaining the control input 41, which is inputted in the control button 12, the portable device may be able to execute the execution function, which is applied to the control button. The control input time condition can be configured by a manufacturer of the portable device or a user. The control input time condition may correspond to whether the control input is over a first threshold time. In case that the control input time condition is greater than the first threshold time, the portable device may be able to execute a second execution function, which is assigned to the control button.

As shown in the bottom left of FIG. 4, the portable device executes the second execution function of the control button and may be then able to apply it in the display unit. For instance, the portable device executes the second execution function and may be then able to start a voice recognition service of the portable device.

Figure 5:
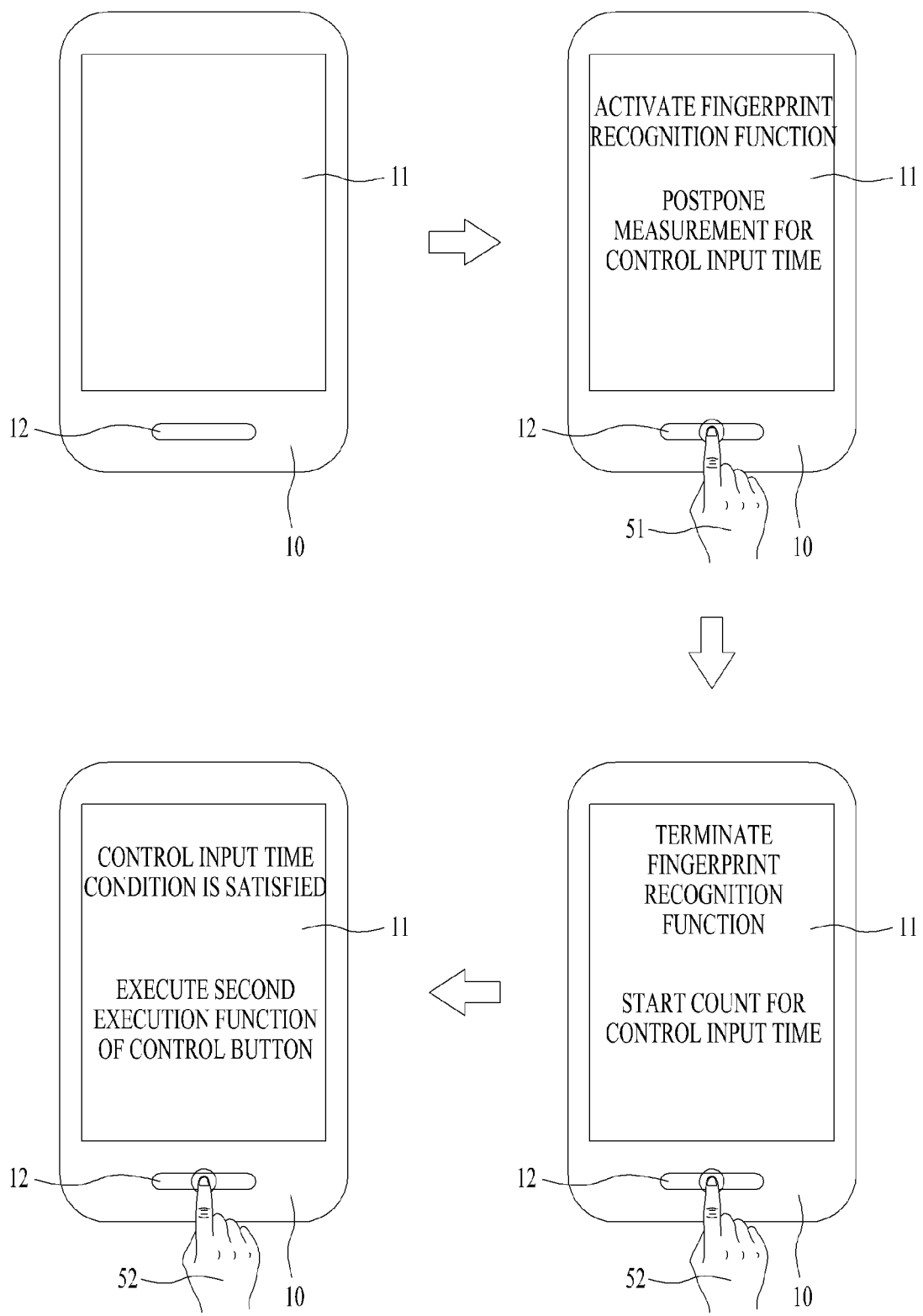
FIG. 5 is a diagram of a method of executing a second execution function of a portable device according to a different embodiment of the present specification.

FIG. 5 is a diagram of a method of executing a second execution function of a portable device according to a different embodiment of the present specification. As shown in the top left of FIG. 5, the portable device 10 may be able to display a user interface in the display unit 11. In case that an application is currently executing, the portable device 10 may be able to display an execution screen of the application in the display unit 11. And, the portable device 10 may be able to display a home screen or a lock screen in the display unit 11.

As shown in the top right of FIG. 5, in case that a control input 51 is inputted in the control button 12, the portable device may be able to execute a fingerprint recognition function. The portable device may be able to recognize a fingerprint of a user using a fingerprint recognition sensor included in the control button 12. The portable device may be able to deactivate the control input detection function while the fingerprint recognition function is executed. Although the control button is pressed or touched by the control input 51, the portable device 10 may be able to postpone a measurement for a control input time. In particular, the portable device may be able to avoid the execution of other operations, which are resulted from detecting the control input, except the fingerprint recognition while the fingerprint recognition function is executed. For instance, although the user presses or touches the control button for more than the first threshold time in a manner of putting a finger on the control button 12 to use the fingerprint recognition function, the portable device may be able to perform the fingerprint recognition function only. In other word, the portable device may not perform the execution function of the control button 12 if the portable device is currently performing the fingerprint recognition function, although the control button satisfied the control input time condition in a manner of being pressed or touched.

In case that the fingerprint recognition function is activated and the control input detection function is deactivated, the portable device may be able to display a soft button corresponding to the control button 12 in the display unit 11. In particular, the portable device may be able to display the soft button capable of performing the deactivated control input detection function of the control button instead. While using the fingerprint recognition function, a user may be able to execute an execution function of the control button in a manner of touching or pressing the displayed soft button. For instance, in case that the execution function of the control button corresponds to a cancel function, the portable device displays the soft button executing the cancel function in the display unit. If the user touches the soft button, the fingerprint recognition function, which is currently executed, can be terminated or cancelled. As a different example, in case that the execution function of the control button corresponds to an execution function of a voice recognition service, the portable device displays a soft button executing the execution function of the voice recognition service in the display unit. If the user touches the soft button, the portable device may be able to execute the voice recognition service.

As shown in the bottom right of FIG. 5, if the fingerprint recognition function is terminated, the portable device may be able to activate the control input detection function. The portable device may be able to measure a control input time for a control input 52 using an activated control input detection function. In this case, the control input 52 may be identical to the control input 51 inputted for the fingerprint recognition. Or, it may correspond to a new control input 52 inputted after the control input 51 for the fingerprint recognition is terminated according to embodiment. The portable device 10 may be able to start a measurement for the control input time when the control input 52 is detected.

As shown in the bottom left of FIG. 5, in case that a control input time, which corresponds to the time of inputting the control input 52, is greater than a first threshold time, the portable device may be able to execute a second execution function. In particular, if the control input 52 satisfies the control input time, the portable device executes a second execution function, which is assigned to the control button, and may be then able to apply it in the display unit. For instance, the portable device may be able to execute a voice recognition service of the portable device in a manner of executing the second execution function.

As a different embodiment, as shown in the top right of FIG. 5, the portable device may be able to measure the control input time from an instance on which the control input 51 is inputted. In this case, the portable device may be able to execute the second execution function if the measured control input time is greater than the sum of the time spent on fingerprint recognition and the first threshold time.

Figure 6:
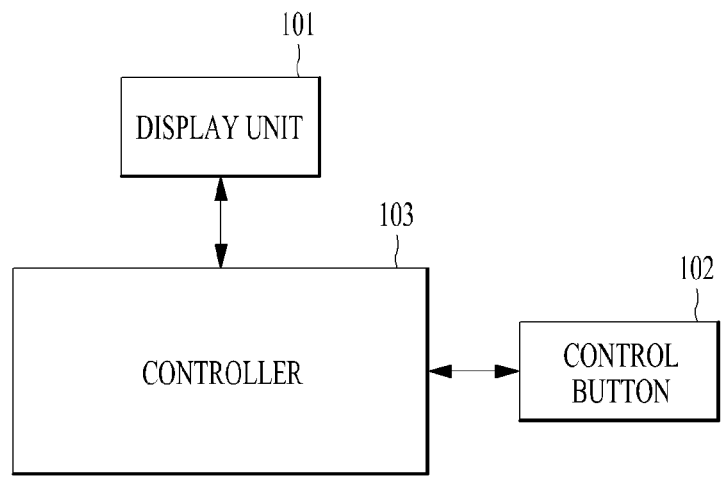
FIG. 6 is a block diagram of a portable device according to one embodiment of the present specification.

FIG. 6 is a block diagram of a portable device according to one embodiment of the present specification. A display device may include a display unit 101, a control button 102, and a controller 103.

The display unit 101 is configured to display content including an execution screen of an application and a home screen. The display unit 101 is able to change a displayed content according to a control command of the controller 103. The display unit 101 may include an organic light emitting diode (OLED), a liquid crystal display (LCD), an e-ink, or a flexible display according to an embodiment. In case that the control input detection function is deactivated, the display unit 101 may be able to display a soft button corresponding to the control button. In particular, the portable device may be able to display the soft button capable of performing the deactivated control input detection function of the control button instead. The user may be able to execute an execution function of the control button in a manner of touching or pressing the displayed soft button while using the fingerprint recognition function.

The control button 102 may be able to execute the fingerprint recognition function and the control input detection function. If a control input is inputted, the control button 102 may be able to recognize a fingerprint of the control input using the fingerprint recognition function. The control button 102 may include a separate sensor for the fingerprint recognition. The control button 12 may be able to include at least one selected from the group consisting of an ultrasonic sensor, a capacitance sensor, and an image sensor.

The control button may be able to capture a fingerprint of a control input using the image sensor. The control button generates ultrasonic using the ultrasonic sensor and may be able to generate information on the fingerprint by receiving the ultrasonic reflected by a finger. The control button may be able to deliver the information on the generated fingerprint to the controller. The control button may be able to generate a fingerprint image in a manner of using the capacitance sensor and a dermis of the finger as both poles and an epidermis of the finger as a dielectric. The control button may be able to deliver the generated fingerprint image to the controller.

If a control input is inputted, the control button 102 may be able to detect the control input using the control input detection function. The control button 102 may be able to detect the control input using a detection switch, a resistive touch screen, or a capacitive touch screen. For instance, the control button may be able to use a push button as the detection switch. If a press for the push button is detected, the control button may be able to detect the press as the control input. And, if a touch for a touch screen is detected, the control button may be able to detect the touch as the control input.

The fingerprint recognition function and the control input detection function of the aforementioned control button 102 can be executed by a single sensor unit included in the control button. In particular, the control button captures a fingerprint of the control input using one image sensor and may be able to detect the captured fingerprint as the control input. As a different embodiment, the control button may include two sensor units executing the aforementioned two functions, respectively. In particular, the control button may become a form of a push button including a capacitance sensor.

The control button 102 may be able to deliver information on a recognized fingerprint or the information on a detected control input to the controller.

The controller 103 may be able to control the display unit using the information delivered from the control button. The controller 103 may be able to execute a security authentication in a manner of being delivered the information on the recognized fingerprint from the control button 102. The controller 103 may be able to determine whether the recognized fingerprint is identical to a reference fingerprint data in a manner of comparing the recognized fingerprint with the reference fingerprint data. The reference fingerprint may be stored in the portable device or stored in an external server, which is connected via a network. The portable device may be able to further include a network unit and may be able to compare the reference fingerprint data stored in the external server via the network with the recognized fingerprint.

If the fingerprint recognition function is started, the controller 103 may be able to deactivate the control input detection function of the control button 102. Hence, although a user presses or touches the control button 102, an execution function corresponding to the control button may not be executed.

If the fingerprint recognition function is terminated, the controller 103 may be able to activate the control input detection function of the control button 102. The controller 103 may be able to execute the execution function corresponding to the control button in a manner of being delivered the information on the detected control input from the control button 102. The controller 103 may be able to execute a different execution function according to a control input time. The controller may be able to execute a first execution function in case that the control input time is less than a first threshold time and may be able to execute a second execution function in case that the control input time is greater than the first threshold time. For instance, the controller may be able to display a home screen of the portable device as the first execution function or may be able to execute a voice recognition service of the portable device as the second execution function. As a different embodiment, if the first control input for the control button is detected in a state of lock, the portable device executes the voice recognition service of the portable device. If the control input for the control button is detected in a state of unlock, the portable device may be able to display the home screen of the portable device.

FIG. 6 is a block diagram of a portable device according to one embodiment of the present specification. Blocks represented as being separated are depicted for elements of the portable device in a manner of being logically distinguished. Thus, the aforementioned elements of the portable device may be equipped with a single chip or a plurality of chips according to a design of the portable device.

Figure 7:
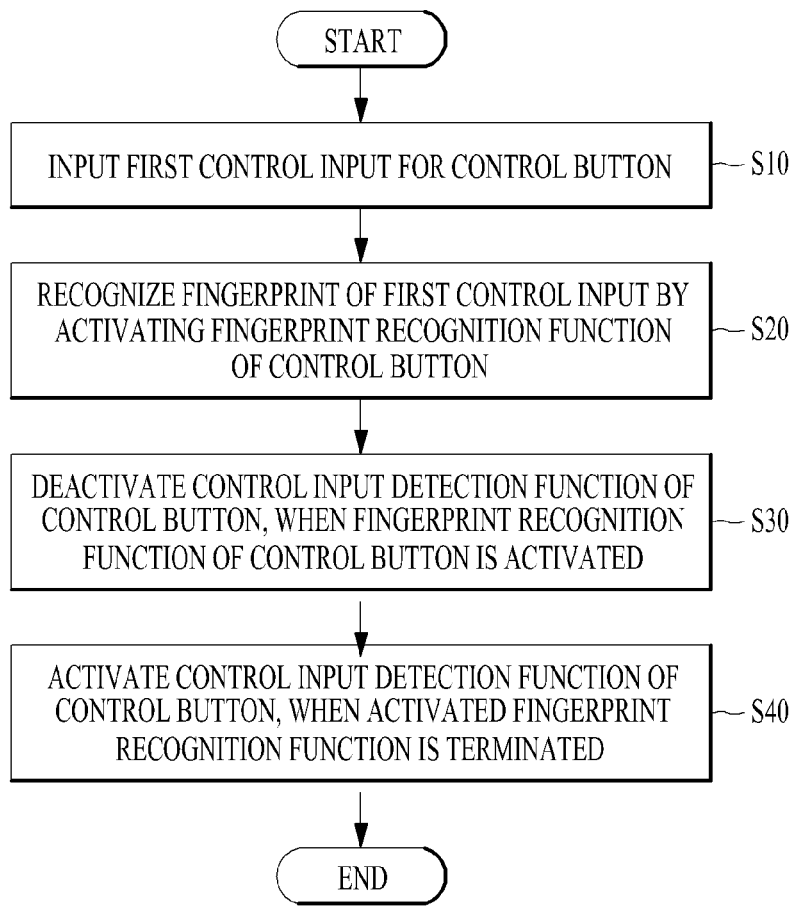
FIG. 7 is a flowchart for a method of controlling a portable device according to one embodiment of the present specification.

FIG. 7 is a flowchart for a method of controlling a portable device according to one embodiment of the present specification. The portable device may be able to receive a first control input for a control button [S10]. The portable device may be able to sense that the first control input is contacted to the control button or is positioned near the control button. The portable device may be able to include a sensor included in the control button or a separate sensor unit to sense the first control input. The portable device may be able to sense that the first control input is positioned near the control button or is contacted to the control button using at least one selected from the group consisting of an image sensor, a proximity sensor, an illuminance sensor, and a touch sensor. In this step, the portable device only senses the first control input and may not detect the first control input as a control input. The first control input may correspond to a touch input, a press input, or a gesture input for the control button.

The portable device may be able to recognize a fingerprint of the first control input by activating a fingerprint recognition function of the control button [S20]. The portable device may be able to recognize the fingerprint of the first control input. As mentioned in FIG. 6, the portable device may be able to recognize the fingerprint using an ultrasonic sensor, a capacitance sensor, or an image sensor, which is included in the control button. In case that the first control input is contacted to the control button, the portable device may be able to recognize the fingerprint using the ultrasonic sensor or the capacitance sensor. And, in case that the first control input is positioned near the control button but not contacted to the control button, the portable device may be able to recognize the fingerprint using the image sensor. The information on the recognized fingerprint is delivered to the controller and can be used for a security authentication.

In case that the fingerprint recognition function of the control button is activated, the portable device may be able to deactivate the control input detection function of the control button [S30]. As mentioned in FIG. 3 and FIG. 5, if the control input detection function is deactivated, the portable device cuts the power supply provided to the control button or may be able to ignore the first control input inputted to the control button. For instance, in case that the control button corresponds to a push button, although a user presses the push button while a fingerprint is recognized by the portable device, the portable device does not detect the push as the first control input and may be able to bypass it. As a different example, in case that the control button corresponds to a touch button, although the user contacts the touch button while the fingerprint is recognized by the portable device, the portable device does not detect the touch as the first control input and may be able to ignore it. In particular, the portable device may not be able to execute the control input detection function while executing the fingerprint recognition function. By doing so, the portable device may be able to avoid an error generating a simultaneous execution of the fingerprint recognition and the control input detection.

In case that the fingerprint recognition function is activated and the control input detection function is deactivated, the portable device may be able to display a soft button corresponding to the control button in the display unit. In particular, the portable device may be able to display the soft button capable of performing the deactivated control input detection function of the control button instead. While using the fingerprint recognition function, a user may be able to execute an execution function of the control button in a manner of touching or pressing the displayed soft button. For instance, the portable device displays the soft button executing a cancel function in the display unit. If the user touches the soft button, the fingerprint recognition function, which is currently executed, can be terminated or cancelled.

In case that the activated fingerprint recognition function is terminated, the portable device may be able to activate the deactivated control input detection function of the control button [S40]. As mentioned in FIG. 3 and FIG. 5, the portable device may be able to detect the first control input by activating the control input detection function. In case that the first control input for the control button is maintained after the fingerprint recognition is terminated, the portable device may be able to detect the first control input.

The portable device may be able to execute a first execution function and a second execution function in response to the detected first control input. After the fingerprint recognition function is terminated, the portable device may be able to execute the first execution function, if the time of detecting the first control input is less than the first threshold time. And, after the fingerprint recognition function is terminated, the portable device may be able to execute the second execution function, if the time of detecting the first control input is greater than the first threshold time.

FIG. 8 is a flowchart for a method of controlling a portable device according to a different embodiment of the present specification. The portable device may be able to receive the first control input for the control button [S110]. As mentioned in FIG. 7, the portable device may be able to sense that the first control input is contacted to the control button or is positioned near the control button. The portable device may be able to include a sensor included in the control button or a separate sensor unit to sense the first control input. The portable device may be able to sense that the first control input is positioned near the control button or is contacted to the control button using at least one selected from the group consisting of an image sensor, a proximity sensor, an illuminance sensor, and a touch sensor. In this step, the portable device only senses the first control input and may not detect the first control input as a control input. The first control input may correspond to a touch input, a press input, or a gesture input for the control button.

The portable device may be able to determine whether fingerprint recognition is necessary [S120]. For instance, the portable device is currently locked and an unlocking scheme corresponds to the fingerprint recognition, the portable device may be able to determine that the fingerprint recognition is necessary. And, the portable device may be able to determine whether the fingerprint recognition is necessary based on an application, which is currently executing. In case that a user authentication or a login is required in the middle of executing the application, the portable device may be able to determine that the fingerprint recognition is necessary. And, the portable device may be able to determine that the fingerprint recognition is required when a banking application is currently executed. In particular, in case that an application makes a request for a fingerprint authentication procedure, the portable device may be able to know that a fingerprint recognition function is necessary.

If the portable device determines that the fingerprint recognition is not necessary, the portable device may be able to detect the first control input by activating the control input detection function.

The portable device may be able to deactivate the control input detection function of the control button [S130]. As mentioned in FIG. 3 and FIG. 5, if the control input detection function is deactivated, the portable device cuts the power supply provided to the control button or may be able to ignore the first control input inputted to the control button. For instance, in case that the control button corresponds to a push button, although a user presses the push button while a fingerprint is recognized by the portable device, the portable device does not detect the push as the first control input and may be able to bypass it. As a different example, in case that the control button corresponds to a touch button, although the user contacts the touch button while the fingerprint is recognized by the portable device, the portable device does not detect the touch as the first control input and may be able to ignore it. In particular, the portable device may not be able to execute the control input detection function while executing the fingerprint recognition function. By doing so, the portable device may be able to avoid an error generating a simultaneous execution of the fingerprint recognition and the control input detection.

In case that the control input detection function is deactivated, the portable device may be able to display a soft button corresponding to the control button in the display unit. In particular, the portable device may be able to display the soft button capable of performing the deactivated control input detection function of the control button instead. While using the fingerprint recognition function, a user may be able to execute an execution function of the control button in a manner of touching or pressing the displayed soft button. For instance, the portable device displays the soft button executing a cancel function in the display unit. If the user touches the soft button, the fingerprint recognition function, which is currently executed, can be terminated or cancelled.

The portable device may be able to recognize a fingerprint of the first control input by activating the fingerprint recognition function of the control button [S140]. The portable device may be able to recognize the fingerprint of the first control input. As mentioned in FIG. 6, the portable device may be able to recognize the fingerprint using an ultrasonic sensor, a capacitance sensor, or an image sensor, which is included in the control button. In case that the first control input is contacted to the control button, the portable device may be able to recognize the fingerprint using the ultrasonic sensor or the capacitance sensor. And, in case that the first control input is positioned near the control button but not contacted to the control button, the portable device may be able to recognize the fingerprint using the image sensor. The information on the recognized fingerprint is delivered to the controller and can be used for a security authentication.

The portable device may be able to determine whether a fingerprint recognition function is terminated [S150]. If recognition for the fingerprint of the first control input is completed or the fingerprint of the first control input is not recognized for more than a second threshold time, the fingerprint recognition function can be terminated. The portable device maintains the fingerprint recognition function as an active state until the fingerprint recognition function is terminated and may be then able to recognize the fingerprint of the first control input.

The portable device may be able to activate the control input detection function of the control button [S160]. As mentioned in FIG. 3 and FIG. 5, the portable device may be able to detect the first control input by activating the control input detection function. In case that the first control input for the control button is maintained after the fingerprint recognition is terminated, the portable device may be able to detect the first control input.

The portable device may be able to execute a first execution function and a second execution function in response to the detected first control input. If the time of detecting the first control input is less than a first threshold time after the fingerprint recognition is terminated, the portable device may be able to execute the first execution function. If the time of detecting the first control input is greater than the first threshold time after the fingerprint recognition is terminated, the portable device may be able to execute the second execution function. For instance, For instance, the portable device may be able to display a home screen of the portable device as the first execution function after terminating a currently executing application. Or, the portable device may be able to execute a voice recognition service of the portable device as the second execution function.

As mentioned in the foregoing description, the portable device of the present specification may be able to adaptively change an object of controlling for an identical control input according to a display region at which a user is staring.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A portable device, comprising:
a display unit configured to display an execution screen of an application of the portable device;
a control button configured to receive a control input including at least one of a fingerprint input corresponding to a security authentication and a push input corresponding to a cancel function; and
a controller configured to:
display a security authentication screen of the application, for which the fingerprint input is needed,
receive a first control input including a first fingerprint input and a first push input when the security authentication screen of the application is displayed,
recognize the first fingerprint input of the first control input by activating a fingerprint recognition function when the first fingerprint input is detected for more than a first threshold time and the first push input of the first control input is not detected,
cancel the security authentication for the application when the first push input of the first control input is detected for a second threshold time or less, even though the security authentication screen of the application is still being displayed and the fingerprint input is detected for the security authentication screen, and
start a voice recognition service of the portable device when the first push input of the first control input is detected for more than the second threshold time, even though the security authentication screen of the application is still being displayed and the fingerprint input is detected for the security authentication screen, wherein the first fingerprint input and the first push input are included in the first control input and received together.

2. The portable device of claim 1, wherein the fingerprint input and the push input are detected by two sensors included in the control button, respectively.

3. The portable device of claim 1, wherein the fingerprint input and the push input are detected by a single sensor included in the control button.

4. The portable device of claim 1, wherein the push input is detected by using at least one of a push button, a detection switch, a resistive touch screen, and a capacitive touch screen.

5. The portable device of claim 1, wherein if a recognition for the first fingerprint input of the first control input is completed or if the first fingerprint input of the first control input is not recognized for more than the first threshold time, the fingerprint recognition function is terminated.

6. The portable device of claim 1, wherein the control button comprises at least one of an ultrasonic sensor, a capacitance sensor, and an image sensor, and wherein the fingerprint input is detected by using at least one of the ultrasonic sensor, the capacitance sensor, and the image sensor.

7. The portable device of claim 1, wherein the controller is further configured to compare the recognized first fingerprint input of the first control input with reference fingerprint data stored in the portable device.

8. The portable device of claim 1, further comprising:
a network unit,
wherein the controller is further configured to compare the recognized first fingerprint input of the first control input with reference fingerprint data stored in an external server.

9. The portable device of claim 1, wherein if the portable device is locked, the controller is further configured to execute the voice recognition service of the portable device when the first control input for the control button is received.

10. The portable device of claim 1, wherein the portable device includes a smartphone, a smart pad, a music player, a tablet computer, or a note book computer.

11. A method for controlling a portable device, the method comprising:
displaying a security authentication screen of an application, for which the fingerprint input needed,
receiving, via a control button, a first control input including a first fingerprint input and a first push input when the security authentication screen of the application is displayed, wherein the first fingerprint input corresponds to a security authentication and a first push input corresponds to a cancel function;
recognizing the first fingerprint input of the first control input by activating a fingerprint recognition function when the first fingerprint input is detected for more than a first threshold time and the first push input of the first control input is not detected,
cancelling the security authentication for the application when the first push input of the first control input is detected for a second threshold time or less, even though the security authentication screen of the application is still being displayed and the fingerprint input is detected for the security authentication screen, and
starting a voice recognition service of the portable device when the first push input of the first control input is detected for more than the second threshold time, even though the security authentication screen of the application is still being displayed and the fingerprint input is detected for the security authentication screen,
wherein the first fingerprint input and the first push input are included in the first control input and received together.

12. The method of claim 11, wherein the fingerprint input and the push input are detected by two sensors included in the control button, respectively.

13. The method of claim 11, wherein the fingerprint input and the push input are detected by a single sensor included in the control button.

14. The method of claim 11, wherein the push input is detected by using at least one of a push button, a detection switch, a resistive touch screen, and a capacitive touch screen of the portable device.

15. The method of claim 11, wherein if a recognition for the first fingerprint input of the first control input is completed or if the first fingerprint input of the first control input is not recognized for more than the first threshold time, the fingerprint recognition function is terminated.

16. The method of claim 11, wherein the control button comprises at least one of an ultrasonic sensor, a capacitance sensor, and an image sensor, and wherein the fingerprint input is detected by using at least one of the ultrasonic sensor, the capacitance sensor, and the image sensor.

17. The method of claim 11, further comprising:
comparing the recognized first fingerprint input of the first control input with reference fingerprint data stored in the portable device.

18. The method of claim 11, further comprising:
comparing the recognized first fingerprint input of the first control input with reference fingerprint data stored in an external server.

19. The method of claim 11, wherein if the portable device is locked, the voice recognition service of the portable device is executed when the first control input for the control button is received.

20. The method of claim 11, wherein the portable device includes a smartphone, a smart pad, a music player, a tablet computer, or a note book computer.

* * * * *